(12) United States Patent
Sugita et al.

(10) Patent No.: US 9,520,588 B2
(45) Date of Patent: Dec. 13, 2016

(54) NONAQUEOUS ELECTROLYTE SECONDARY CELL

(75) Inventors: Yasunari Sugita, Osaka (JP); Kazuki Endo, Osaka (JP); Tatsuya Ishibashi, Osaka (JP); Masato Fujikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 245 days.

(21) Appl. No.: 14/343,198

(22) PCT Filed: Sep. 14, 2012

(86) PCT No.: PCT/JP2012/005889
§ 371 (c)(1),
(2), (4) Date: Mar. 6, 2014

(87) PCT Pub. No.: WO2013/038701
PCT Pub. Date: Mar. 21, 2013

(65) Prior Publication Data
US 2014/0302366 A1    Oct. 9, 2014

(30) Foreign Application Priority Data

Sep. 14, 2011    (JP) ................. 2011-200479

(51) Int. Cl.
*H01M 10/0587* (2010.01)
*H01M 2/26* (2006.01)
*H01M 4/70* (2006.01)

(52) U.S. Cl.
CPC ............. *H01M 2/263* (2013.01); *H01M 4/70* (2013.01); *H01M 10/0587* (2013.01); *Y02E 60/122* (2013.01)

(58) Field of Classification Search
CPC .................. H01M 2004/028; H01M 10/0587; H01M 2/263; H01M 4/70
See application file for complete search history.

(56) References Cited

U.S. PATENT DOCUMENTS

| | | | | |
|---|---|---|---|---|
| 4,658,498 A | * | 4/1987 | Yamaura | H01M 4/40 29/623.1 |
| 5,196,281 A | * | 3/1993 | Pensabene | B22F 3/1143 429/209 |

(Continued)

FOREIGN PATENT DOCUMENTS

| | | |
|---|---|---|
| JP | 08-153542 A | 6/1996 |
| JP | 09-180761 A | 7/1997 |

(Continued)

OTHER PUBLICATIONS

International Search Report issued in International Application No. PCT/JP2012/005889 with Date of mailing Oct. 16, 2012, with English Translation.

*Primary Examiner* — Ula C Ruddock
*Assistant Examiner* — Lisa S Park
(74) *Attorney, Agent, or Firm* — McDermott Will & Emery LLP

(57) ABSTRACT

A nonaqueous electrolyte secondary battery includes: an electrode group including a positive electrode plate, a negative electrode plate, and a separator. The positive and negative electrode plates are wound with the separator interposed therebetween. The positive electrode plate includes a first current collector exposed portion where a portion of the positive electrode current collector corresponding to an outermost portion of the electrode group is exposed over a length of greater than or equal to one turn in a winding direction of the electrode group, and a second current collector exposed portion where a portion of the positive electrode current collector corresponding to a (Continued)

middle portion of the electrode group is exposed over a length of greater than or equal to one turn in the winding direction. A positive electrode lead is provided on the second current collector exposed portion so as to be connected to an external electrode.

5 Claims, 2 Drawing Sheets

(56) References Cited

U.S. PATENT DOCUMENTS

| | | | |
|---|---|---|---|
| 5,989,743 A | | 11/1999 | Yamashita |
| 6,235,426 B1* | | 5/2001 | Yanai .................... H01M 2/263 |
| | | | 429/178 |
| 6,461,759 B1* | | 10/2002 | Miller ............... H01M 10/0431 |
| | | | 429/127 |
| 7,501,201 B2* | | 3/2009 | Ishikawa ........... H01M 10/0431 |
| | | | 29/623.1 |
| 8,142,928 B2* | | 3/2012 | Blomgren ............. H01M 4/661 |
| | | | 429/211 |
| 2009/0029240 A1* | | 1/2009 | Gardner ................. H01M 2/08 |
| | | | 429/94 |
| 2010/0227211 A1* | | 9/2010 | Chang .................. H01M 2/266 |
| | | | 429/152 |
| 2012/0009450 A1* | | 1/2012 | Chun .................... H01M 2/023 |
| | | | 429/94 |
| 2013/0316207 A1* | | 11/2013 | Suwa .................... H01M 10/05 |
| | | | 429/94 |

FOREIGN PATENT DOCUMENTS

| | | |
|---|---|---|
| JP | 2001-110453 A | 4/2001 |
| JP | 2007-109612 A | 4/2007 |

\* cited by examiner

NONAQUEOUS ELECTROLYTE SECONDARY CELL

RELATED APPLICATIONS

This application is a national phase application of the U.S. National Phase under 35 U.S.C. §371 of International Application No. PCT/JP2012/005889, filed on Sep. 14, 2012, which in turn claims the benefit of Japanese Application No. 2011-200479, filed on Sep. 14, 2011, the disclosures of which Applications are incorporated by reference herein.

TECHNICAL FIELD

The present disclosure relates to the structures of electrode plates of nonaqueous electrolyte secondary batteries.

BACKGROUND ART

In recent years, the widespread use of portable devices, such as laptop personal computers and mobile phones, has led to the growing demand for batteries serving as power sources of the portable devices. There has been an increasing demand for, in particular, small and lightweight secondary batteries that have high energy density and can be repeatedly charged and discharged. There has recently been a growing new demand for such secondary batteries as power sources for driving, for example, electric tools, hybrid cars, and electric vehicles.

To address such a demand, nonaqueous electrolyte secondary batteries typified by lithium ion secondary batteries have been actively researched and developed. As performance is enhanced, and the output power of devices is improved, the energy of each of nonaqueous electrolyte secondary batteries has been increasing, and the amount of heat generated under abnormal conditions has increased.

Abnormal heat generation in a battery means, for example, heat generation caused by an internal short circuit in the battery or by overcharging. In particular, when a battery can and an electrode group are deformed with foreign matter, for example, by inserting a nail into a corresponding battery to create an internal short circuit between a positive electrode and a negative electrode in the electrode group, the amount of heat generated by a short circuit current passing through a positive electrode active material increases. Thus, the safety of such a battery is problematic.

To address such an internal short circuit, PATENT DOCUMENTS 1-3 each describe a nonaqueous electrolyte secondary battery including a battery can in which a wound electrode group is housed. In the nonaqueous electrolyte secondary battery, a current collector exposed portion of a positive electrode and a current collector exposed portion of a negative electrode facing the current collector exposed portion of the positive electrode each have a length of greater than or equal to one turn in a winding direction of the electrode group. In particular, in a situation where the current collector exposed portions are formed in an outermost portion of the electrode group, even when an internal short circuit is created, for example, by inserting a nail into the battery, the resistance of the short circuit path between the current collector exposed portions of the positive and negative electrodes formed in the outermost portion is less than that of the short circuit path between portions of active materials corresponding to an inner portion of the electrode group. Thus, short circuit current flows locally through a short circuit path between the current collector exposed portions. Consequently, the sharp increase in battery temperature can be reduced. Furthermore, if such a short circuit path between the current collector exposed portions is distributed in the electrode group, the sharp increase in battery temperature can be further reduced.

CITATION LIST

Patent Documents

PATENT DOCUMENT 1: Japanese Unexamined Patent Publication No. H08-153542
PATENT DOCUMENT 2: Japanese Unexamined Patent Publication No. H09-180761
PATENT DOCUMENT 3: Japanese Unexamined Patent Publication No. 2007-109612

SUMMARY OF THE INVENTION

Technical Problem

A battery is charged/discharged, or electric energy is exchanged between the battery and the outside, by chemical-to-electrical energy conversion between a positive electrode plate and a negative electrode plate via a positive electrode lead and a negative electrode lead.

Typically, a positive electrode lead is connected to a portion of a positive electrode plate corresponding to an innermost portion of an electrode group, and a negative electrode lead is connected to a portion of a negative electrode plate corresponding to an outermost portion of the electrode group. In this case, as described in PATENT DOCUMENTS 1-3, even when an internal short circuit occurs due to, for example, the insertion of a nail into a battery, a low-resistance short circuit path between current collector exposed portions of positive and negative electrodes is formed in an outermost portion of the electrode group, and furthermore, such a low-resistance short circuit path is distributed in the electrode group, thereby reducing the sharp increase in battery temperature.

Incidentally, when the positive electrode lead is connected to a portion of the positive electrode plate corresponding to a middle portion of the electrode group, the current collector resistance can be reduced to about ¼ of that obtained when the positive electrode lead is connected to a portion of the positive electrode plate corresponding to an innermost portion of the electrode group. Thus, if the positive electrode lead is connected to the portion of the positive electrode plate corresponding to the middle portion of the electrode group, the battery output power can be improved.

However, such batteries with improved output power lead to the increased short circuit current, which makes it difficult for only conventional measures to ensure adequate safety of the batteries. Furthermore, if many short circuit paths between the current collector exposed portions are distributed in the electrode group, the increase in battery temperature can be reduced to some extent; however, on the other hand, the battery energy density decreases, and such a decrease is against the demand for batteries with increased capacity and improved output power.

It is therefore a principal object of the present disclosure to provide a nonaqueous electrolyte secondary battery having improved output power and having a simple configuration that ensures safety even in a situation where an internal short circuit occurs in the battery under abnormal conditions.

Solution to the Problem

In order to solve the problem, the present disclosure proposes a nonaqueous electrolyte secondary battery including a wound electrode group, wherein an outermost portion and a middle portion of the electrode group each include a current collector exposed portion of the positive electrode having a length of greater than or equal to one turn, and the current collector exposed portion in the middle portion is connected to a positive electrode lead.

Specifically, a nonaqueous electrolyte secondary battery of the present disclosure includes: a positive electrode plate including a positive electrode current collector, and a positive electrode active material layer applied onto the positive electrode current collector; a negative electrode plate including a negative electrode current collector, and a negative electrode active material layer applied onto the negative electrode current collector; an electrode group including the positive electrode plate, the negative electrode plate, and a separator, the positive and negative electrode plates being wound with the separator interposed therebetween; and a battery can in which the electrode group is housed. The positive electrode plate includes a first current collector exposed portion where a portion of the positive electrode current collector corresponding to an outermost portion of the electrode group is exposed over a length of greater than or equal to one turn in a winding direction of the electrode group, and a second current collector exposed portion where a portion of the positive electrode current collector corresponding to a middle portion of the electrode group is exposed over a length of greater than or equal to one turn in the winding direction, and a positive electrode lead is provided on the second current collector exposed portion so as to be connected to an external electrode.

Advantages of the Invention

The present disclosure can provide a nonaqueous electrolyte secondary battery having improved output power and having a simple configuration that can ensure safety even in a situation where an internal short circuit occurs in the battery under abnormal conditions.

DESCRIPTION OF EMBODIMENTS

Figure 1:
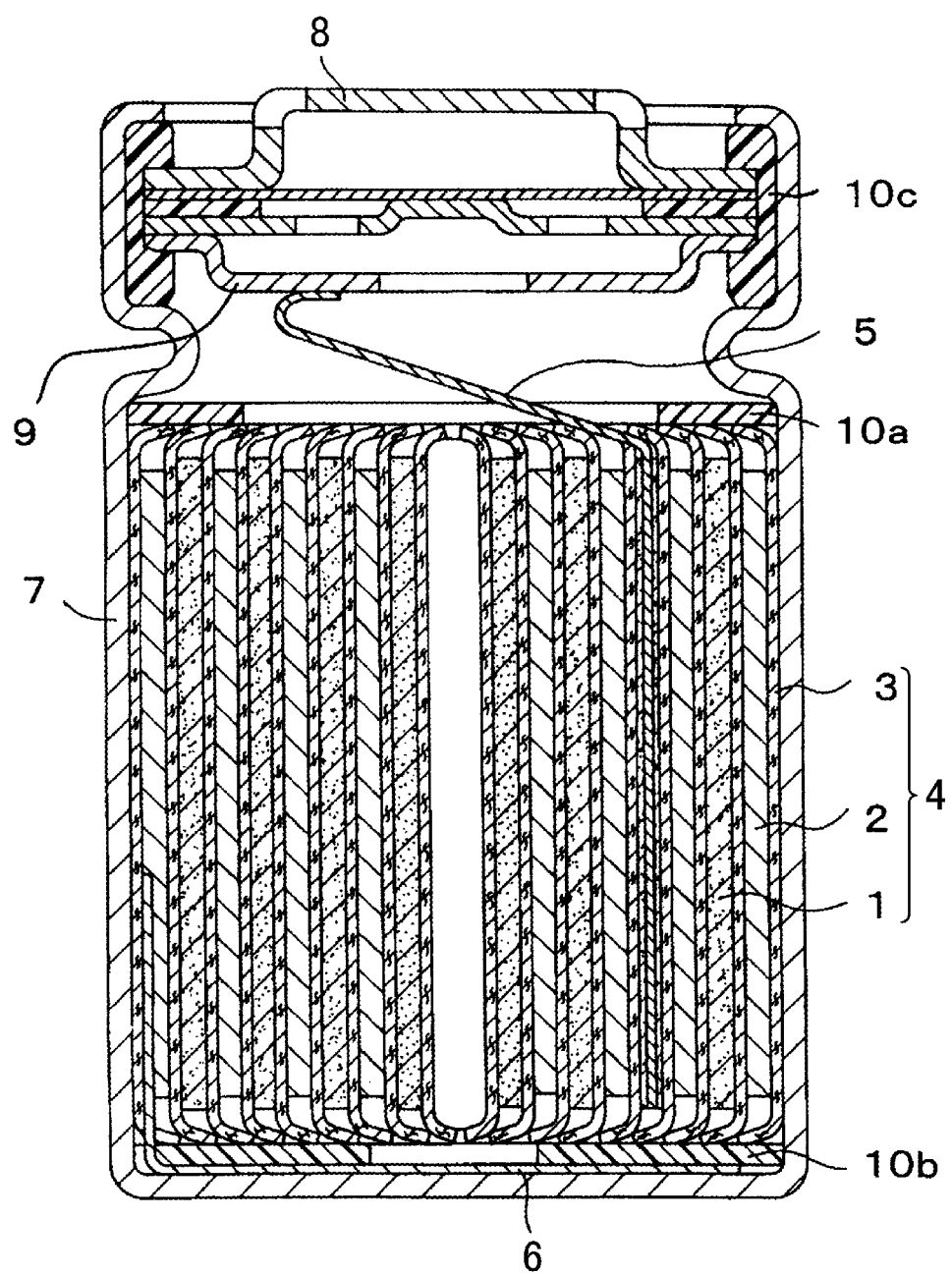
FIG. 1 is a cross-sectional view schematically illustrating the configuration of a cylindrical lithium ion battery according to an embodiment of the present disclosure.

The present disclosure relates to a nonaqueous electrolyte secondary battery including a positive electrode plate including a positive electrode current collector, and a positive electrode active material layer applied onto the positive electrode current collector; a negative electrode plate including a negative electrode current collector, and a negative electrode active material layer applied onto the negative electrode current collector; an electrode group including the positive electrode plate, the negative electrode plate, and a separator, the positive and negative electrode plates being wound with the separator interposed therebetween; and a battery can in which the electrode group is housed.

The positive electrode plate includes a first current collector exposed portion where a portion of the positive electrode current collector corresponding to an outermost portion of the electrode group is exposed over a length of greater than or equal to one turn in a winding direction of the electrode group, and a second current collector exposed portion where a portion of the positive electrode current collector corresponding to a middle portion of the electrode group is exposed over a length of greater than or equal to one turn in the winding direction, and a positive electrode lead is provided on the second current collector exposed portion so as to be connected to an external electrode.

When stress is applied to the battery can due to foreign matter such as a nail to cause an internal short circuit in the electrode group, a low-resistance internal short circuit path is formed between the first current collector exposed portion corresponding to the outermost portion of the electrode group and a portion of the negative electrode plate facing the first current collector exposed portion. Furthermore, the foreign matter such as the nail enters the electrode group, a relatively high-resistance internal short circuit path is formed between the positive electrode active material layer and the negative electrode active material layer. In other words, internal short-circuits between the positive electrode plate and the negative electrode plate occur sequentially inward of the electrode group.

In this case, an internal short circuit occurs near the positive electrode lead provided on a middle portion of the electrode group (a longitudinally middle portion of the positive electrode plate). The current collector resistance of the positive electrode plate including the positive electrode lead on the middle portion of the electrode group is reduced to improve output power. Thus, when an internal short circuit occurs in the middle portion of the electrode group, the short circuit current increases. Therefore, the increased short circuit current increases the amount of heat generated in a portion of the positive electrode active material layer near the positive electrode lead on the middle portion of the electrode group.

In the present disclosure, a portion of the positive electrode plate corresponding to the middle portion of the electrode group connected to the positive electrode lead includes a second current collector exposed portion where the positive electrode current collector is exposed over a length of greater than or equal to one turn in the winding direction. Thus, a low-resistance short circuit path can be formed in a region where a large short circuit current is generated. This can reduce the amount of heat generated by the flow of a short circuit current into the positive electrode active material layer, and reduce abnormal heat generation of the battery.

Here, the middle portion of the electrode group including the second current collector exposed portion of the positive electrode plate is a portion of the electrode group within a range of $\frac{2}{3}L$ or less from each of outer and inner ends of a portion of the positive electrode plate to which the positive electrode active material layer is applied, where L represents a distance between the inner and outer ends. When a portion of the positive electrode plate within the range is connected through the positive electrode lead to the outside, the resistance of the positive electrode current collector is less than or equal to about ½ of that obtained when the positive electrode lead is provided on an innermost portion of the positive electrode plate. Thus, a positive electrode plate accommodating improved output power can be provided.

Consequently, a nonaqueous electrolyte secondary battery including the positive electrode plate of the present disclosure can ensure safety against an abnormal internal short circuit arising from foreign matter such as a nail even with the output power improved. In addition, not only a portion of the positive electrode plate corresponding to the outermost portion of the electrode group, but also a portion thereof corresponding to the middle portion of the electrode group connected to the positive electrode lead merely need to each include a current collector exposed portion where the positive electrode current collector is exposed over a length of greater than or equal to one turn in the winding direction. Thus, the energy density of the battery does not decrease. The above configuration enables the provision of a nonaqueous electrolyte secondary battery having improved output power and having a simple configuration that can ensure safety even in a situation where an internal short circuit occurs in the battery under abnormal conditions.

In the present disclosure, it is preferable that the positive electrode plate further includes a third current collector exposed portion between the first and second current collector exposed portions, and that the third current collector exposed portion corresponds to a portion of the positive electrode current collector exposed over a length of greater than or equal to one turn in the winding direction. In a process in which internal short circuits occur sequentially inward of the electrode group, a low-resistance internal short circuit path is formed in the third current collector exposed portion. This can reduce the flow of the short circuit current increasing toward the middle portion of the electrode group into the positive electrode active material layer, and further improve the battery safety.

In the present disclosure, a single surface or both surfaces of portions of the positive electrode current collector may be exposed to obtain the first, second, and third current collector exposed portions of the positive electrode plate.

In the present disclosure, the negative electrode plate preferably includes a current collector exposed portion where a portion of the negative electrode current collector facing the first current collector exposed portion of the positive electrode plate is exposed. The negative electrode plate preferably includes a current collector exposed portion where a portion of the negative electrode current collector facing the second and/or third current collector exposed portion of the positive electrode plate is exposed. The above configuration can further reduce the resistance of the short circuit path formed by each of the outermost and inner current collector exposed portions.

Embodiments of the present disclosure will be described in detail hereinafter with reference to the drawings. The present disclosure is not limited to the following embodiments. Various changes and modifications may be made without departing from the scope of the invention. The following embodiments may be combined with other embodiments.

FIG. 1 is a cross-sectional view schematically illustrating the configuration of a cylindrical lithium ion battery according to an embodiment of the present disclosure.

In FIG. 1, the cylindrical lithium ion battery includes a positive electrode plate 1 that includes a positive electrode current collector made of aluminum foil and coated with a positive electrode active material layer, a negative electrode plate 2 that includes a negative electrode current collector made of copper foil and coated with a negative electrode active material layer, and an electrode group 4 formed by winding the positive electrode plate 1 and the negative electrode plate 2 with a 20-µm-thick separator 3 interposed therebetween. A positive electrode lead 5 is resistance-welded to the positive electrode current collector, and a negative electrode lead 6 is resistance-welded to the negative electrode current collector. The electrode group 4 and an electrolyte are housed in a battery can 7. An upper insulating plate 10a and a lower insulating plate 10b are placed above and under the electrode group 4, respectively. One end of the negative electrode lead 6 is resistance-welded to the inside bottom of the battery can 7. One end of the positive electrode lead 5 is laser welded to a metal filter 9. A sealing plate 8 seals the open end of the battery can 7 with a gasket 10c interposed therebetween.

Figure 2:
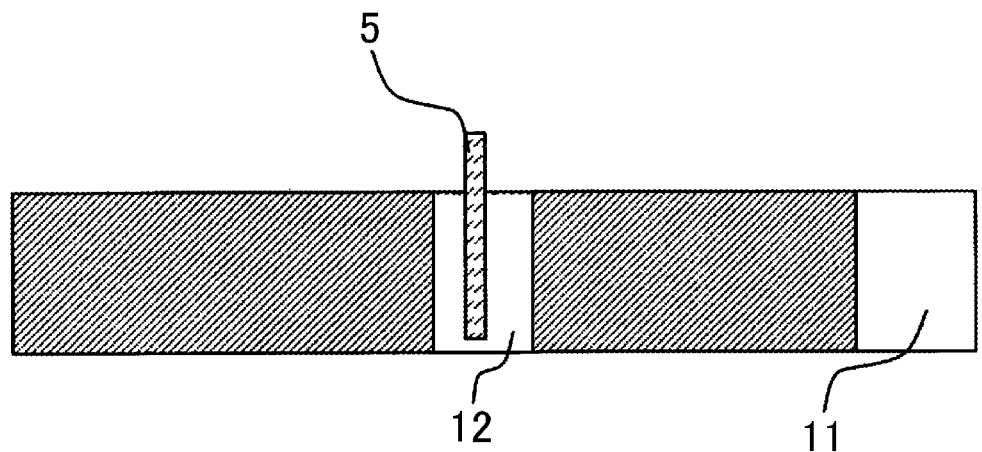
FIG. 2 is a plan view schematically illustrating the configuration of a positive electrode plate according to the embodiment of the present disclosure.

FIG. 2 is a plan view schematically illustrating the configuration of the positive electrode plate 1 according to the embodiment of the present disclosure.

As illustrated in FIG. 2, the positive electrode plate 1 includes a first current collector exposed portion 11 corresponding to an outermost portion of the electrode group 4, and a second current collector exposed portion 12 corresponding to a middle portion of the electrode group 4. In each of the first and second current collector exposed portions 11 and 12, the positive electrode current collector is exposed over a length of greater than or equal to one turn in a winding direction of the positive electrode plate. The positive electrode lead 5 is provided on the second current collector exposed portion 12 so as to be connected to an external electrode (the sealing plate 8). The positive electrode lead 5 is, for example, resistance-welded to the second current collector exposed portion 12.

Figure 3:
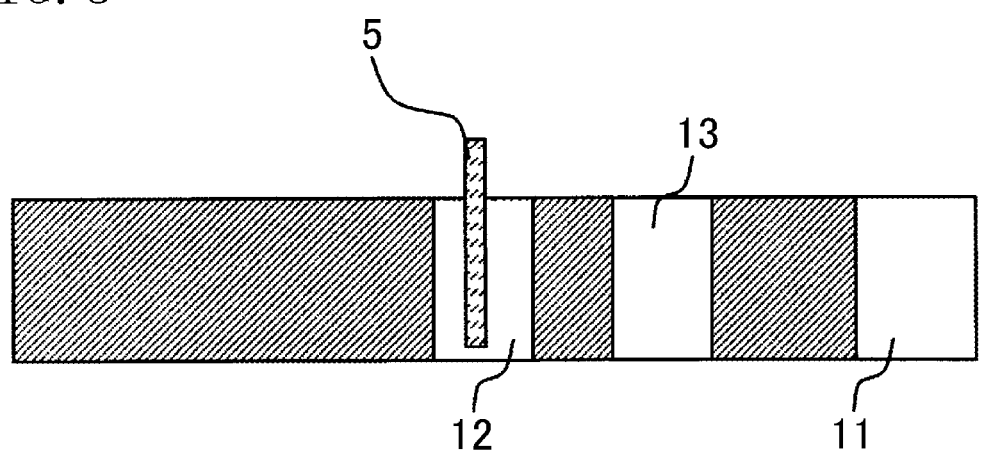
FIG. 3 is a plan view schematically illustrating the configuration of a positive electrode plate according to another embodiment of the present disclosure.

FIG. 3 is a plan view schematically illustrating the configuration of a positive electrode plate 1 according to another embodiment of the present disclosure.

As illustrated in FIG. 3, the positive electrode plate 1 further includes a third current collector exposed portion 13 between a first current collector exposed portion 11 and a second current collector exposed portion 12. Here, in the third current collector exposed portion 13, a positive electrode current collector is exposed over a length of greater than or equal to one turn in a winding direction of the positive electrode plate.

Figure 4:
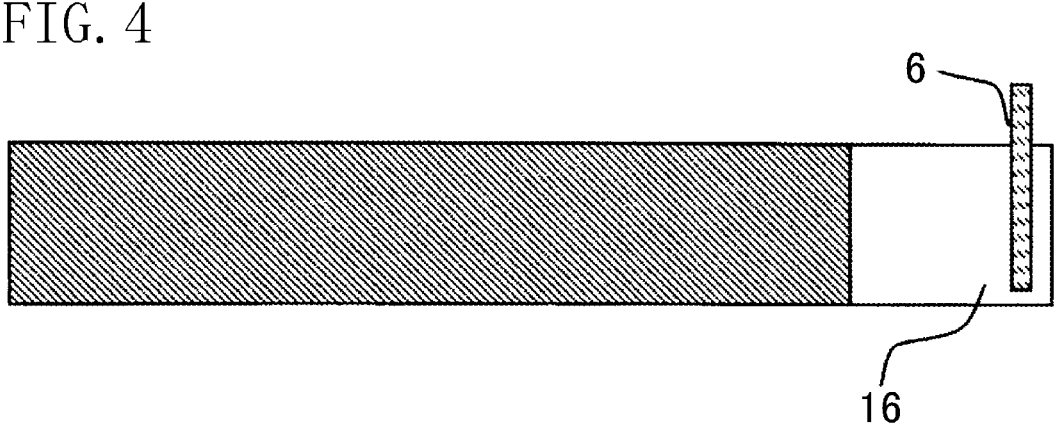
FIG. 4 is a plan view schematically illustrating the configuration of a negative electrode plate 2 according to the embodiment of the present disclosure.

FIG. 4 is a plan view schematically illustrating the configuration of the negative electrode plate 2 according to the embodiment of the present disclosure.

As illustrated in FIG. 4, the negative electrode plate 2 includes a current collector exposed portion 16 corresponding to the outermost portion of the electrode group 4. In the current collector exposed portion 16, the negative electrode current collector is exposed over a length of greater than or equal to one turn in a winding direction of the negative electrode plate. The negative electrode lead 6 is resistance-welded to the current collector exposed portion 16.

In the case where foreign matter such as a nail causes internal short circuits between the positive electrode plate 1 and the negative electrode plate 2 sequentially inward of the electrode group 4, the amount of heat generated in a portion of the positive electrode active material layer near the positive electrode lead 5 provided on the middle portion of the electrode group increases due to an increase in short circuit current. When such a positive electrode plate 1 of the present disclosure as illustrated in FIG. 2 or 3 is used, the second current collector exposed portion 12 causes the formation of a low-resistance short circuit path in a region which surrounds the positive electrode lead 5 and in which the amount of short circuit current increases, thereby reducing the increase in the amount of heat generated in the positive electrode active material layer. Furthermore, the third current collector exposed portion 13 between the first and second current collector exposed portions 11 and 12 enables the formation of a low-resistance internal short circuit path during a process in which internal short circuits are sequentially created. This can further reduce abnormal heat generation of the battery.

The positive electrode plate 1 includes the positive electrode current collector and the positive electrode active material layer.

Examples of the positive electrode active material can include a lithium-containing transition metal complex oxide, specifically, lithium cobaltate, lithium nickelate, lithium manganite, and modified products thereof. Examples of a conductive agent can include graphites such as natural graphite and artificial graphite, and carbon blacks such as acetylene black and ketjen black. Examples of a binder can include polyvinylidene fluoride (PVDF) and polytetrafluoroethylene (PTFE).

Examples of the positive electrode current collector can include metal foil containing, for example, aluminum, an aluminum alloy, stainless steel, and titanium, and a punched material.

For example, positive electrode mixture slurry is applied onto the surface of the positive electrode current collector, and is dried and rolled to obtain the positive electrode active material layer. The positive electrode mixture slurry can be prepared by dissolving or dispersing, for example, the positive electrode active material, the binder, and the conductive agent in an organic solvent or water. Examples of the organic solvent can include N-methyl-2-pyrrolidone. The positive electrode active material layer is applied onto a single surface or both surfaces of the positive electrode current collector.

The positive electrode current collector includes uncoated portions (first and second current collector exposed portions) at desired locations, and the positive electrode lead 5 is welded to the second current collector exposed portion to fabricate the positive electrode plate 1. The positive electrode lead 5 is made of, for example, aluminum.

The negative electrode plate 2 includes the negative electrode current collector and the negative electrode active material layer.

Examples of the negative electrode active material can include a carbon material, an element that can be alloyed with lithium, a silicon compound, a tin compound, a lithium metal, and an alloy. Examples of the carbon material include natural graphite, artificial graphite, and hard carbon. Examples of the element that can be alloyed with lithium include Al, Si, Zn, Ge, Cd, Sn, Ti, and Pb. Examples of a binder can include polyvinylidene fluoride and styrene-butadiene-rubber (BM-500B) containing an acrylic acid monomer. A conductive agent identical with that contained in the positive electrode active material layer can be used as a conductive agent. Examples of a thickener can include carboxymethylcellulose and poly(ethylene oxide).

Examples of the negative electrode current collector can include metal foil of, e.g., stainless steel, nickel, and copper, and a punched material.

For example, negative electrode mixture slurry is applied onto the surface of the negative electrode current collector, and is dried and rolled to obtain the negative electrode active material layer. The negative electrode mixture slurry can be prepared by dissolving or dispersing, for example, the negative electrode active material, the binder, the conductive agent, and the thickener in an organic solvent or water. Examples of the organic solvent can include NMP.

The negative electrode current collector includes an uncoated portion (current collector exposed portion) at a desired location, and the negative electrode lead 6 is welded to the current collector exposed portion to fabricate the negative electrode plate 2. The negative electrode lead 6 can be made of, for example, nickel, a nickel alloy, copper, or copper coated with nickel.

The positive electrode plate 1 and the negative electrode plate 2 are wound with the separator 3 interposed therebetween such that the positive electrode lead 5 and the negative electrode lead 6 are led in opposite directions, thereby forming the electrode group 4. The electrode group 4 is inserted into the battery can 7, and is welded to the negative electrode lead 6 and the inside bottom of the battery can 7.

Examples of the separator 3 include a microporous thin film, woven fabric, and nonwoven fabric. Polyolefine, such as polypropylene or polyethylene, is used as a material of the separator 3.

An electrolyte (e.g., lithium salt) is dissolved in a nonaqueous solvent to obtain a nonaqueous electrolyte. Examples of the nonaqueous solvent include cyclic carbonate, chain carbonate, and cyclic carboxylate. Examples of the electrolyte include $O_4$, $LiBF_4$, and $LiPF_6$.

EXAMPLES

Examples of the present disclosure will be described in detail hereinafter. However, the present disclosure is not limited to the examples.

In order to evaluate the safety of the nonaqueous electrolyte secondary battery of the present disclosure, cylindrical nonaqueous electrolyte secondary batteries were fabricated through the following steps.

Example 1

(1) Fabrication of Positive Electrode Sheet

One hundred parts by mass of lithium cobaltate powder as a positive electrode active material, three parts by mass of acetylene black as a conductive agent, and a solution containing, as a binder, four parts by mass of polyvinylidene fluoride (PVDF) dissolved in a solvent of N-methyl pyrrolidone (NMP) were mixed to obtain paste containing a positive electrode mixture. The paste was applied onto both surfaces of a 15-μm-thick aluminum foil current collector, and was dried and then rolled to fabricate a 175-μm-thick positive electrode plate.

The positive electrode plate included a first current collector exposed portion 11 formed such that both surfaces of a portion of the aluminum foil corresponding to an outermost portion of an electrode group are exposed over a length of one turn in a winding direction of the electrode plate.

The resultant positive electrode plate was cut to have a width of 58 mm and a length of 615 mm, thereby fabricating a strip-shaped positive electrode plate 1. A middle portion of the strip-shaped positive electrode plate 1 between inner and outer ends of a portion of the strip-shaped positive electrode plate 1 coated with the positive electrode active material layer, i.e., a portion of the strip-shaped positive electrode plate 1 that is 280 mm apart from the inner end thereof, included a second current collector exposed portion 12 where the aluminum foil was exposed over a length of one turn in the winding direction of the positive electrode plate. A 3.5-mm-wide, 75-mm-long, and 0.15-mm-thick positive electrode lead 5 made of aluminum was resistance-welded to the second current collector exposed portion 12 to fabricate the positive electrode plate 1 illustrated in FIG. 2. This positive electrode plate 1 corresponds to a positive electrode plate A.

(2) Fabrication of Negative Electrode Sheet

One hundred parts by mass of artificial graphite powder, a 40% by mass dispersion of one part by mass of styrene-butadiene rubber particles in water, one part by mass of carboxymethylcellulose, and an appropriate amount of water were mixed and stirred to prepare negative electrode mixture slurry. The negative electrode mixture slurry was applied onto both surfaces of a 8-μm-thick copper foil current collector, and was dried and then rolled to fabricate a 177-μm-thick negative electrode plate.

The negative electrode plate included a current collector exposed portion 16 where both surfaces of a portion of the copper foil corresponding to an outermost portion of the electrode group 4 were exposed over a length of greater than or equal to the length of the outermost first current collector exposed portion 11 of the positive electrode plate A.

The resultant negative electrode plate was cut to have a width of 59 mm and a length of 675 mm, thereby fabricating a negative electrode plate 2. One end of a 3-mm-wide, 37-mm-long, and 0.15-mm-thick negative electrode lead 6 made of nickel is connected to the current collector exposed portion 16 of the negative electrode plate 2 to obtain the negative electrode plate 2 illustrated in FIG. 4. This negative electrode plate 2 corresponds to a negative electrode plate A.

(3) Preparation of Nonaqueous Electrolyte

One part by mass of vinylene carbonate was added to 99 parts by mass of a mixed solvent containing ethylene carbonate, ethyl methyl carbonate, and dimethyl carbonate in a volume ratio of 1:1:1 as a nonaqueous solvent, and lithium phosphate hexafluoride ($LiPF_6$) was dissolved in a concentration of 1.0 mol/L to obtain a nonaqueous electrolyte.

(4) Fabrication of Sealed Secondary Battery

The positive electrode plate A and the negative electrode plate A were wound with a separator 3 interposed therebetween to fabricate a cylindrical electrode group 4. The separator 3 is made of a 16-μm-thick microporous polyethylene film. An upper insulating plate 10a and a lower insulating plate 10b were placed above and under the electrode group 4, respectively. Thereafter, a negative electrode lead 6 was welded to the inside bottom of a battery can 7, and a positive electrode lead 5 was welded to a metal filter 9. The resultant electrode group 4 was inserted into the battery can 7 (diameter: 18.2 mm, height: 65 mm, inside diameter: 17.9 mm) Then, the nonaqueous electrolyte was injected into the battery can 7. Finally, a sealing plate 8 seals an opening of the battery can 7 with a gasket 10c interposed therebetween, thereby completing a battery A. The resultant cylindrical battery had a diameter of 18.2 mm, a height of 65 mm, and a capacity of 2660 mAh.

Example 2

A battery B was fabricated in a manner similar to that of the battery A except that a middle portion of the positive electrode plate A fabricated in the first example between the first and second current collector exposed portions 11 and 12, i.e., a portion thereof that is 420 mm apart from the inner end of the strip-shaped positive electrode plate 1, included a third current collector exposed portion 13 where only the outer circumferential surface of the aluminum foil is exposed, thereby obtaining such a positive electrode plate B as illustrated in FIG. 3. The capacity of the battery B was 2530 mAh.

Example 3

A battery C was fabricated in a manner similar to that of the battery A except that the positive electrode plate A fabricated in the first example was used, and a negative electrode plate B was used as a negative electrode plate. The negative electrode plate B is obtained by allowing the negative electrode plate A fabricated in the first example to further include a current collector exposed portion having a length of one turn in a winding direction of the negative electrode plate and facing the second current collector exposed portion 12 of the positive electrode plate A. The capacity of the battery C was 2530 mAh.

Comparative Example 1

A positive electrode plate X was fabricated in a manner similar to that of the positive electrode plate A except that a middle portion of the positive electrode plate A fabricated in the first example included a current collector exposed portion instead of the second current collector exposed portion 12, and a portion of the positive electrode plate A that was 180 mm apart from the inner end thereof included another current collector exposed portion where both surfaces of aluminum foil were exposed over a length of one turn in a winding direction of the positive electrode plate. In the current collector exposed portion of the middle portion of the positive electrode plate A, an exposed portion of a current collector has an area large enough to be connected to a positive electrode lead 5, and the exposed portion was connected to the positive electrode lead 5.

A negative electrode plate X was obtained in a manner similar to that of the negative electrode plate A except that a portion of the negative electrode plate A fabricated in the first example faced the current collector exposed portion of the positive electrode plate X near the inner end thereof, and included a current collector exposed portion where copper foil was exposed.

A battery X was fabricated in a manner similar to that of the battery A of the first example except that the positive electrode plate X and the negative electrode plate Y were used. The capacity of the battery X was 2670 mA.

(Evaluation Test)

The nonaqueous electrolyte secondary batteries obtained in the first through third examples and the first comparative example were evaluated for safety by a nail insertion test described below.

[Nail Insertion Test]

The batteries were charged under the conditions below. Then, in an atmosphere of 25° C., an iron nail with a diameter of 3 mm was inserted into each charged battery through the side surface of the charged battery to a depth of 9 mm at a speed of 10 mm per second to cause an internal short circuit. After 30 seconds from the short circuit, the temperature of the battery was measured with a thermocouple placed on a part of the side surface of the battery apart from a part thereof into which the nail was inserted. Table 1 illustrates the test results.

Constant current charge: at a current of 1400 mA until a voltage of 4.3 V Constant voltage charge: at a voltage of 4.3 V until a current of 100 mA

TABLE 1

| | NAIL INSERTION TEST BATTERY SURFACE TEMPERATURE (° C.) |
|---|---|
| EXAMPLE 1 | 94 |
| EXAMPLE 2 | 91 |
| EXAMPLE 3 | 83 |
| COMPARATIVE EXAMPLE 1 | 131 |

As clear from Table 1, the surface temperature of each of the batteries of the first through third examples in the nail insertion test is lower than that of the nonaqueous electrolyte secondary battery of the first comparative example. Thus, the safety of the batteries of the first through third examples during the internal short circuit is high. The temperature of, in particular, each of the batteries of the first through third examples did not significantly increase even after the nail insertion test. This showed that the battery has no problem of safety. In contrast, the temperature of the battery of the first comparative example kept increasing even after the test. The test result showed that the battery of the first comparative example has a problem of safety.

The foregoing results showed that the nonaqueous electrolyte secondary batteries of the first through third examples of the present disclosure have higher safety against internal short circuits caused by inserting foreign matter such as a nail into the batteries than the nonaqueous electrolyte secondary battery of the first comparative example.

The present disclosure has been described by way of the preferred embodiment. However, such description of the embodiment should not be construed as limiting, and thus, various modifications can be made thereto. For example, although the cylindrical nonaqueous electrolyte secondary battery including a wound electrode group has been described in the above embodiment, the nonaqueous electrolyte secondary battery of the present disclosure is not limited thereto, and includes various types of secondary batteries. Examples of the nonaqueous electrolyte secondary battery of the present disclosure include a rectangular battery including a wound electrode group, a rectangular battery including a wound flat electrode group, a laminated battery including a laminated electrode group housed in a laminated film, and a rectangular battery including a laminated electrode group.

INDUSTRIAL APPLICABILITY

The nonaqueous electrolyte secondary battery of the present disclosure is useful for, for example, power sources of portable electronic devices, and power sources for driving electric tools and electric vehicles.

DESCRIPTION OF REFERENCE CHARACTERS

1 POSITIVE ELECTRODE SHEET
2 NEGATIVE ELECTRODE SHEET
3 SEPARATOR
4 ELECTRODE GROUP
5 POSITIVE ELECTRODE LEAD
6 NEGATIVE ELECTRODE LEAD
7 BATTERY CAN
8 SEALING PLATE
9 METAL FILTER
10a UPPER INSULATING PLATE
10b LOWER INSULATING PLATE
10c GASKET
11 FIRST CURRENT COLLECTOR EXPOSED PORTION
12 SECOND CURRENT COLLECTOR EXPOSED PORTION
13 THIRD CURRENT COLLECTOR EXPOSED PORTION
16 CURRENT COLLECTOR EXPOSED PORTION OF NEGATIVE ELECTRODE SHEET

The invention claimed is:

1. A nonaqueous electrolyte secondary battery comprising:
a positive electrode plate including a positive electrode current collector, and a positive electrode active material layer applied onto the positive electrode current collector;
a negative electrode plate including a negative electrode current collector, and a negative electrode active material layer applied onto the negative electrode current collector;
an electrode group including the positive electrode plate, the negative electrode plate, and a separator, the positive and negative electrode plates being wound with the separator interposed therebetween; and
a battery can in which the electrode group is housed, wherein
the positive electrode plate includes
a first current collector exposed portion where a portion of the positive electrode current collector corresponding to an outermost portion of the electrode group is exposed over a length of greater than or equal to one turn in a winding direction of the electrode group, and
a second current collector exposed portion where a portion of the positive electrode current collector corresponding to a middle portion of the electrode group is exposed over a length of greater than or equal to one turn in the winding direction, and
a positive electrode lead is provided on the second current collector exposed portion so as to be connected to an external electrode,
the second current collector exposed portion is formed within the range of ⅔ L or less from each of inner and outer ends of a portion of the positive electrode plate to which the positive electrode active material layer is applied, where L represents a distance between the inner and outer ends in the winding direction, and
the middle portion is arranged between the inner and outer ends in the winding direction.

2. The nonaqueous electrolyte secondary battery of claim 1, wherein
the positive electrode plate further includes a third current collector exposed portion between the first and second current collector exposed portions, and
the third current collector exposed portion corresponds to a portion of the positive electrode current collector exposed over a length of greater than or equal to one turn in the winding direction.

3. The nonaqueous electrolyte secondary battery of claim 1, wherein
the negative electrode plate includes a current collector exposed portion where a portion of the negative electrode current collector facing the first current collector exposed portion of the positive electrode plate is exposed.

4. The nonaqueous electrolyte secondary battery of claim 1, wherein
the negative electrode plate includes a current collector exposed portion where a portion of the negative electrode current collector facing the second current collector exposed portion of the positive electrode plate is exposed.

5. The nonaqueous electrolyte secondary battery of claim 2, wherein
the negative electrode plate includes a current collector exposed portion where a portion of the negative electrode current collector facing the third current collector exposed portion of the positive electrode plate is exposed.

* * * * *